United States Patent
Sen et al.

(10) Patent No.: US 6,708,034 B1
(45) Date of Patent: Mar. 16, 2004

(54) END-TO-END QUALITY OF SERVICE GUARANTEE IN A WIRELESS ENVIRONMENT

(75) Inventors: Sanjoy Sen, Plano, TX (US); Jayshree Bharatia, Plano, TX (US)

(73) Assignee: Nortel Networks Ltd., St. Laurent (CA)

( * ) Notice: Subject to any disclaimer, the term of this patent is extended or adjusted under 35 U.S.C. 154(b) by 356 days.

(21) Appl. No.: 09/661,112

(22) Filed: Sep. 13, 2000

Related U.S. Application Data

(60) Provisional application No. 60/153,623, filed on Sep. 13, 1999.

(51) Int. Cl.[7] .................. H04Q 7/20; H04Q 7/00
(52) U.S. Cl. ............. 455/445; 455/446; 455/422.1; 455/554.2; 370/328; 370/401
(58) Field of Search ..................... 455/422.1, 445, 455/466, 412, 446, 426.1, 426.2, 3.01, 3.05, 414.1, 418, 554.2, 554.1; 370/328, 341, 401, 392; 709/923, 238, 245, 202

(56) References Cited

U.S. PATENT DOCUMENTS

| | | | | |
|---|---|---|---|---|
| 6,044,062 A | * | 3/2000 | Brownrigg et al. | 370/238 |
| 6,078,566 A | * | 6/2000 | Kikinis | 370/286 |
| 6,208,620 B1 | * | 3/2001 | Sen et al. | 370/231 |
| 6,385,451 B1 | * | 5/2002 | Kalliokulju et al. | 455/437 |
| 2002/0099854 A1 | * | 7/2002 | Jorgensen | 709/249 |

* cited by examiner

*Primary Examiner*—Sinh Tran
*Assistant Examiner*—Kamran Afshar
(74) *Attorney, Agent, or Firm*—James A. Harrison; Bruce E. Garlick; Ken Bolvin

(57) ABSTRACT

A mobile station communicates with an RSVP-aware network over an air interface standard that has a wireless quality of service standard. The mobile station transmits an RSVP message to an end terminal through the network's RSVP-enabled routers. The end terminal transmits an RESV response message back to the mobile station. A base station controller intercepts this message and sets up the wireless resources if possible.

9 Claims, 8 Drawing Sheets

| Winsock2 FLOWSPEC | Tspec | Rspec |
|---|---|---|
| TokenRate | TokenBucketRate | Rate |
| TokenBucketSize | TokenBucketSize | |
| PeakBandwidth | PeakRate | |
| MinimumPolicedSize | MinimumPolicedUnit | |
| MaxSduSize | MaximumPaketSize | |
| Delay Variation | | DelaySlackTerm |
| Latency | | |

FIG. 7

END-TO-END QUALITY OF SERVICE GUARANTEE IN A WIRELESS ENVIRONMENT

RELATED APPLICATIONS

This is a 35 U.S.C. §111(a) application of provisional patent application U.S. Ser. No. 60/153,623 filed on Sep. 13, 1999 and claims full benefit therefrom.

BACKGROUND OF THE INVENTION

I. Field of the Invention

The present invention relates generally to wireless networks. Particularly, the present invention relates to RSVP signaling to improve quality of service in wireless data transmissions.

II. Description of the Related Art

ReSerVation Protocol (RSVP) was developed in the mid-90s to combat congestion in data networks by allowing routers to decide in advance whether they could meet the requirements of an application flow. In the RSVP scheme, the routers reserved the desired router resources if they were available. RSVP signaling is currently widely used in Internet protocol (IP) networking equipment to improve the quality of service (QoS) provided to end-users. RSVP, however, is not typically used in wireless data services networks due to operator concerns about scalability and the overhead required to support potentially millions of host-to-host flows.

RSVP requests resources for simplex flows, (i.e., it requests resources in only one direction). Therefore, RSVP treats a sender as logically distinct from a receiver, although the same application process may act as both sender and receiver at the same time. RSVP occupies the place of a transport protocol in the protocol stack. However, RSVP does not transport application data but is an Internet control protocol. Like the implementation of routing and management protocols, an implementation of RSVP will typically execute in the background and not in the data-forwarding path.

RSVP is not a routing protocol. Routing protocols determine where packets get forwarded. RSVP is only concerned with the QoS of those packets that are forwarded in accordance with the routing.

FIG. 1 illustrates a typical wireline network using RSVP signaling. In this network, the sending terminal (101) can be a computer or other type of data terminal. The sending terminal (101) initiates a data session by requesting resources from the network. The network determines which routers (105, 106, 107, and 108) are needed in order to communicate between the sending terminal (101) and the end terminal (110). The required routers are then reserved for the session.

RSVP is useful when QoS needs to be guaranteed for a wireline terminal communicating over a network. However, when a wireless terminal needs to communicate over a wireless interface using an air interface standard such as general packet radio service (GPRS), QoS cannot be guaranteed. There is a resulting unforeseen need for a method to guarantee end-to-end QoS over a wireless network.

SUMMARY OF THE INVENTION

The present invention encompasses a process for generating end-to-end quality of service in a network that is coupled to a wireless mobile station. The network is comprised of a plurality of RSVP-enabled routers that are coupled to a base station controller. The base station controller communicates traffic over an air interface to the mobile station. The air interface standard has a quality of service standard that is interfaced to the RSVP-enabled routers.

The process interfaces the air interface quality of service standard with the RSVP-enabled routers. The mobile station then transmits an RSVP message to an end terminal through the base station controller and the plurality of RSVP-enabled routers.

The end terminal transmits an RESV response message back to the mobile station. The base station controller intercepts this message and attempts to set up the wireless resources required for the call. If the controller can set up the resources, it does so and forwards the RESV message to the mobile station. If the controller cannot set up the resources, the RESV message is dropped and the call is not allowed to go through.

In the preferred embodiment, the end terminal is a wireline terminal that is coupled to the network through a wireline interface. In another embodiment, the end terminal is a wireless terminal that is coupled to the network through a base station controller.

BRIEF DESCRIPTION OF THE DRAWINGS

FIG. 7 shows a table that maps between Generic QoS and the RSVP Flow_Spec (Tspec and Rspec).

DETAILED DESCRIPTION OF THE PREFERRED EMBODIMENT

The present invention provides end-to-end QoS in a wireless environment. The process of the present invention provides a wireless terminal with the ability to interface the QoS of the air interface standard with the RSVP signaling of the network in order to provide the end-to-end QoS guarantee.

Figure 1:
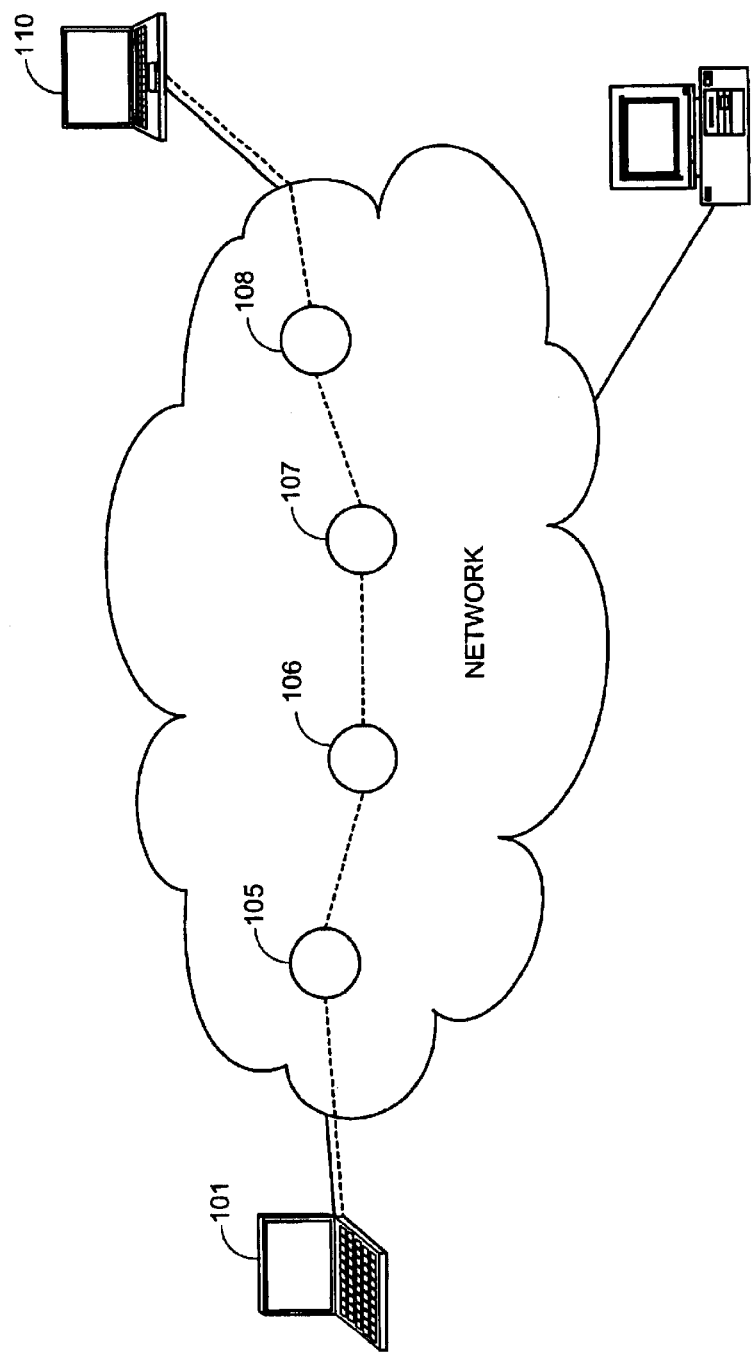
FIG. 1 shows a typical prior art wireline network using RSVP.
Figure 2:
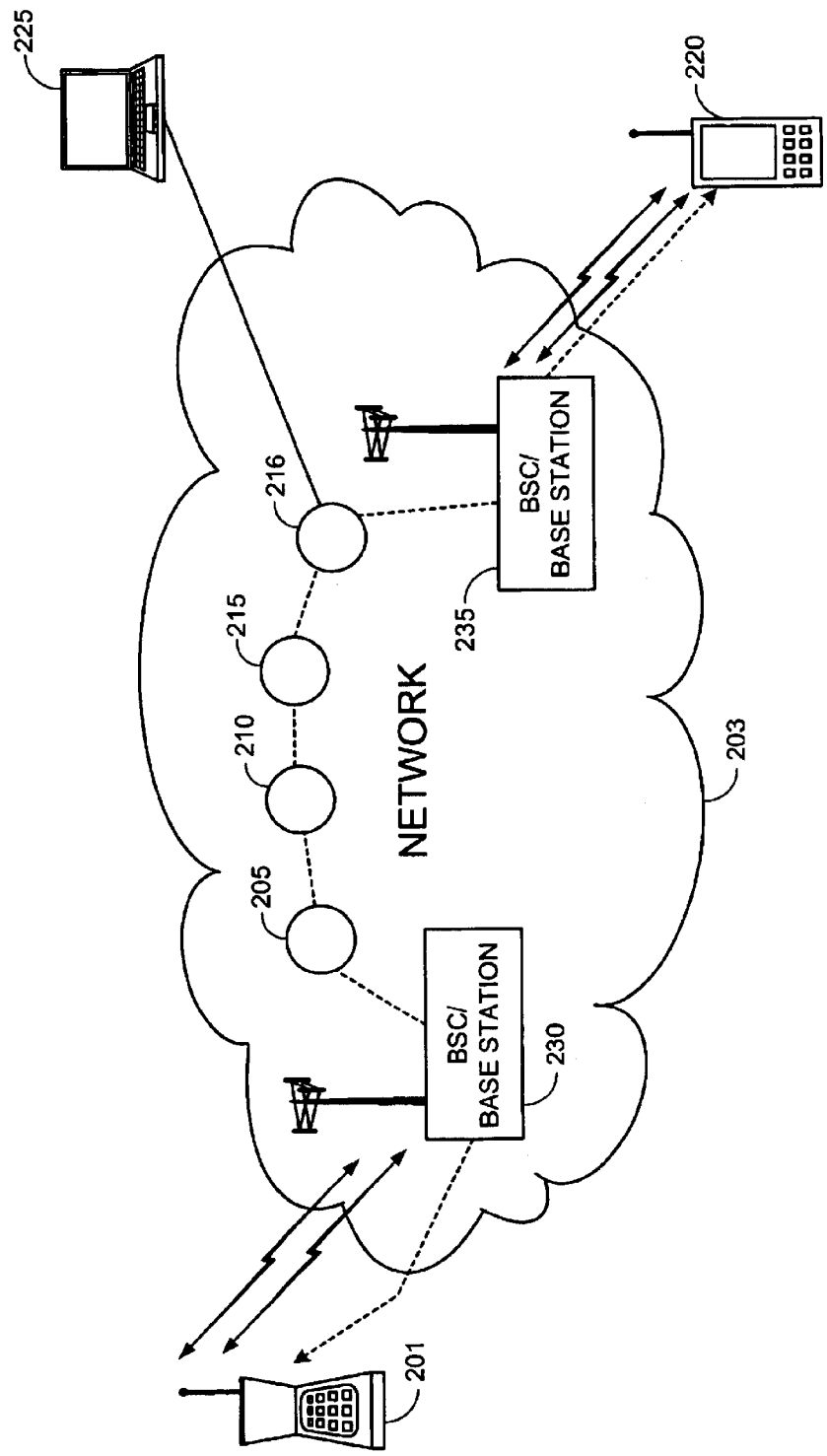
FIG. 2 shows a data network communicating with a wireless terminal in accordance with the present invention.

FIG. 2 illustrates a wireless system of the present invention. This system is comprised of a wireless mobile station (201), a network (203) comprised of a plurality of routers (205, 210, 215 and 216), and an end terminal (220 or 225) with which the mobile station (201) is communicating. The end terminal (220 or 225) can be coupled to the network (203) as either a wireless terminal (220), using one of many air interface standards, or as a wireline terminal (225).

In the preferred embodiment, the network (203) is a GPRS network coupled to the Internet. Alternate embodiments use a local area network, wide area network, or other types of networks.

Additionally, at least one base station controller (BSC) is required, depending on the proximity of the end terminal or mobile station to the originating base station. In the illustrated embodiment of FIG. 2, one BSC (230) couples the originating terminal (201) to the network (203) while a second BSC (235) couples the end terminal (220) to the network (203).

BSC's and their function are well known in the cellular telephone art. A BSC controls one or more base stations by routing the cellular radiotelephone signals from the mobile switching center to the appropriate base station with which a subscriber is registered.

In the preferred embodiment, the mobile stations or terminals are radiotelephones that communicate in a cellular environment. Alternate embodiments use other types of terminals such as wireless personal digital assistants, computers with wireless capability, and other wireless communication devices.

The preferred embodiment of the present invention uses the GPRS air interface standard and the subsequent discussion of the present invention is based on the GPRS standard. The present invention, however, is not limited to GPRS. Alternate embodiments use other air interface standards such as TDMA and CDMA.

GPRS is a packet-based data transmission standard for GSM data networks that allows transmission speeds over 100 kbps and supports IP. The IP support is particularly important now that companies are looking to the Internet as a way for their employees to access corporate intranets and consumers can gain additional mobility while downloading email and other data.

Figure 3:
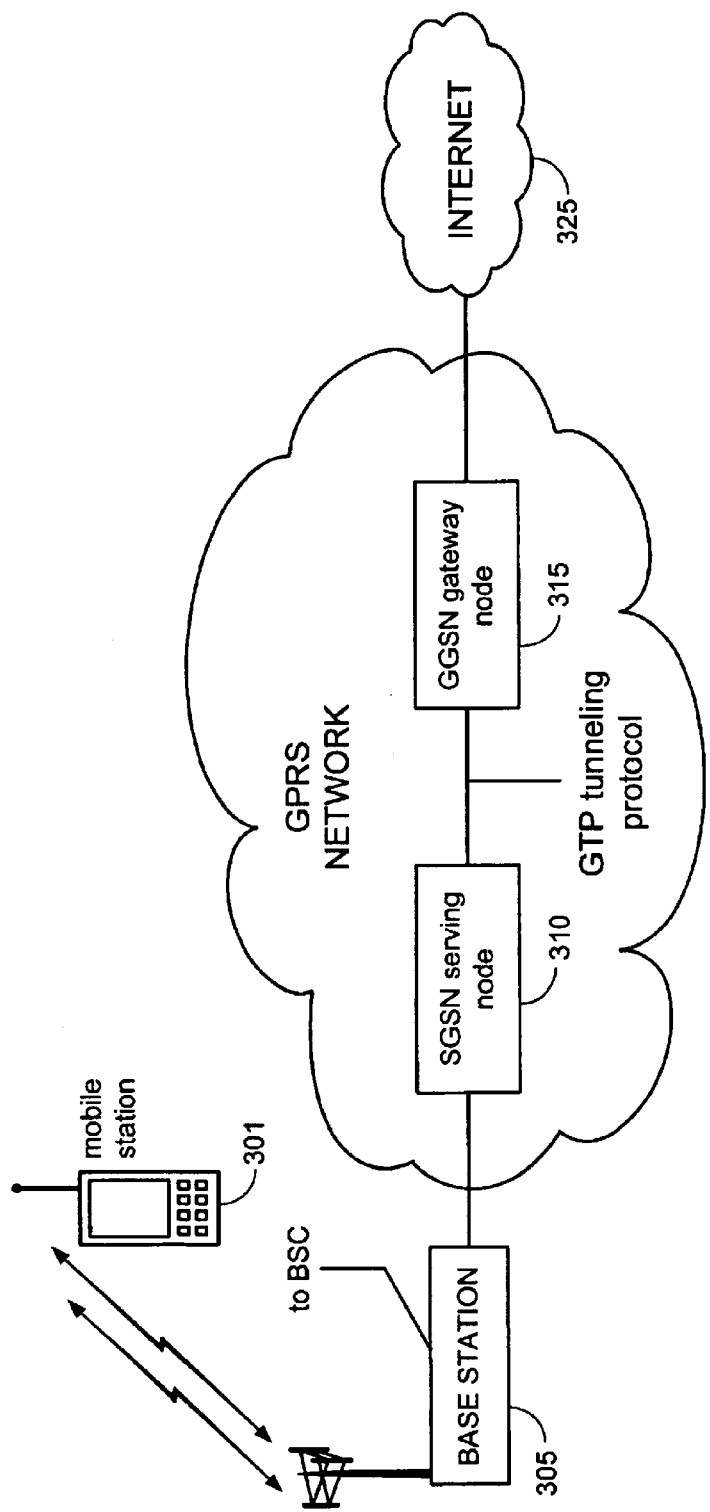
FIG. 3 shows a block diagram of a connection of a wireless terminal to a GPRS network.

In order to better understand GPRS, FIG. 3 illustrates a GPRS terminal communicating with a GPRS network. A notebook computer (301) coupled to a GPRS-capable cellular radiotelephone or modem, either through a serial cable or other type of connection such as Universal Serial Bus (USB) or local wireless link, acts as the mobile station and generates the data signal to be transmitted. In alternate embodiments, the mobile station may also be a PC Card.

The mobile station (301) communicates with a GSM base station (305) that is controlled by a BSC. Unlike circuit-switched data calls that are connected to voice networks by the mobile switching center, GPRS packets are sent from the base station (305) to a Serving GPRS Support Node (SGSN) (310). The SGSN (310) is the node within the GSM infrastructure that sends and receives data to and from the mobile stations. It also keeps track of the mobile stations within its service area.

The SGSN communicates with what is called the Gateway GPRS Support Node (GGSN) (315), a system that maintains connections with other networks such as the Internet, X.25 networks or private networks. A GPRS network can use multiple serving nodes, but requires only one gateway node for connecting to an external network such as the Internet.

When the mobile station (301) sends packets of data, it is via the SGSN (310) to the GGSN (315) that converts them for transmission over the desired network, which could be the Internet, X.25 networks or private networks. IP packets from the Internet (325) addressed for the mobile station (301) are received by the GGSN (315), forwarded to the SGSN (310) and then transmitted to the mobile station (301) through the base station (305).

To forward IP or X.25 packets between each other, the SGSN (310) and GGSN (315) encapsulate these packets using a specialized protocol called the GPRS tunnel protocol (GTP) that operates over the top of standard TCP/IP protocols. But the details of the SGSN and GGSN are both invisible and irrelevant to the user who experiences a straightforward IP or X.25 connection that just happens to be wireless.

An interesting aspect of GPRS is how it achieves its high speeds of over 100 kbps when circuit-switched data today is limited to 9.6 or 14.4 kbps. GPRS uses the same radio channel as voice calls, a channel that is 200 kHz wide. This radio channel carries a raw digital radio stream of 271 kbps that, for voice calls, is divided into 8 separate data streams, each carrying about 34 kbps. After protocol and error correction overhead, 13 kbps is left for each voice connection or about 14 kbps for data. Circuit-switched data today uses one voice channel. GPRS can combine up to 8 of these channels, and since each of these can deliver up to 14 kbps of data throughput, the net result is that users will be able to enjoy rates over 100 Kbps.

However, not all eight-voice channels have to be used. In fact, the most economical mobile stations are limited to 56 kbps. The GPRS standard defines a mechanism by which a mobile station can request the amount of bandwidth it desires at the time it establishes a data session.

In subsequent discussions of the present invention, it is assumed that the mobile station is already registered with the cellular system in which it is operating. This registration process is well known in the art. It is also assumed that the mobile station has a default packet data protocol (PDP) context (that may only support best-effort QoS). The mobile station is running a QoS-aware application and its operating system is capable of generating and interpreting RSVP messages.

Any QoS-aware application can inform its QoS requirements and traffic profiles to the RSVP agent in the operating system using a QoS application such as Generic QoS (GQoS), which is well known in the art. The RSVP agent then generates the PATH and/or RESV messages using this information. The SGSN is assumed to have an RSVP agent and, therefore, is RSVP-enabled.

As is well known in the art, the RSVP agent is a process resident in a terminal, node or other device that handles the RSVP signaling for that device. The RSVP agent enables that device to interface with other RSVP enabled devices or networks.

The PATH message provides a traffic description that includes the bit rate, bandwidth requirement, and delay among other things. The RESV message provides the QOS parameters of the traffic to be received (known in the art as Flowspec), the source(s) from which QOS traffic is to be received (known in the art as Filterspec) and the destination of the traffic (the session).

If the mobile station application is the data sender, it generates the PATH message and receives an RESV message. If the mobile station application is the receiver of the data, it is going to generate an RESV message after it has received a PATH message from the sender. The RESV message will traverse the opposite route as traversed by the PATH message. The cases of the mobile station being the sender and the mobile station being the receiver of data are considered separately.

Figure 4A:
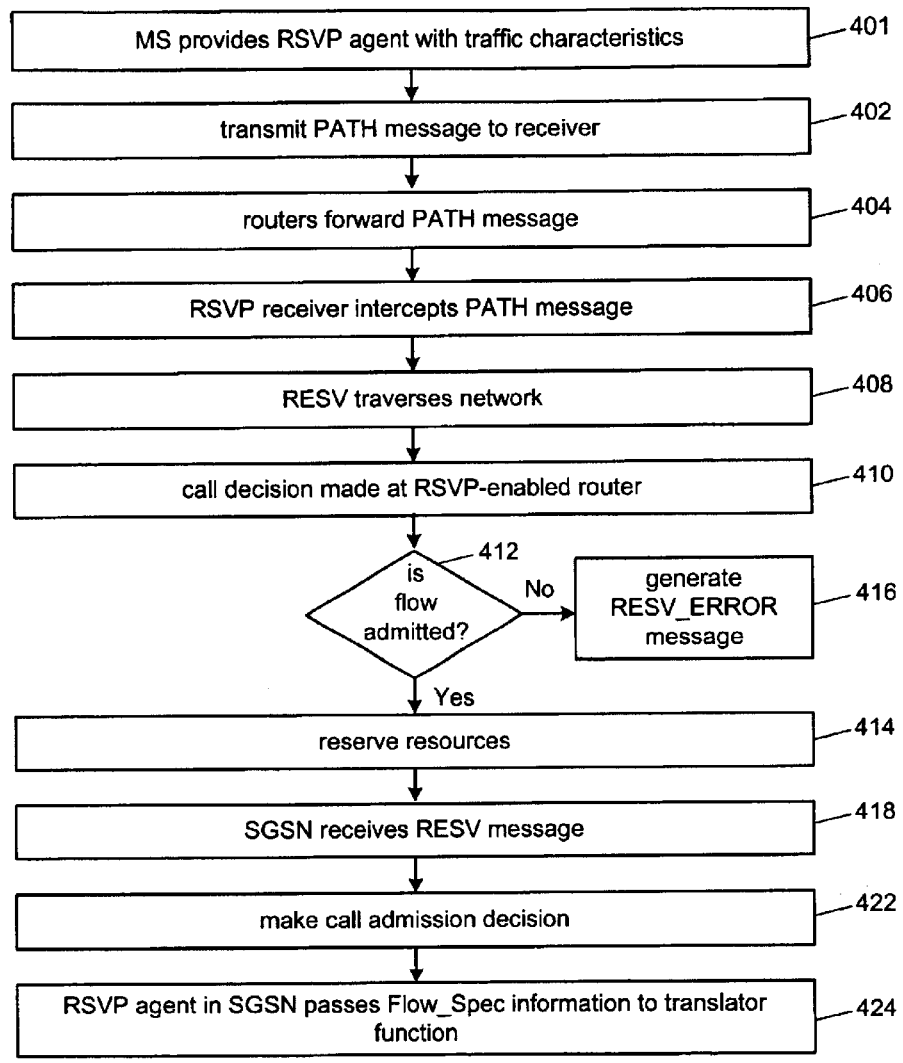
FIGS. 4A and B show a flowchart of the process of the present invention.
Figure 4B:
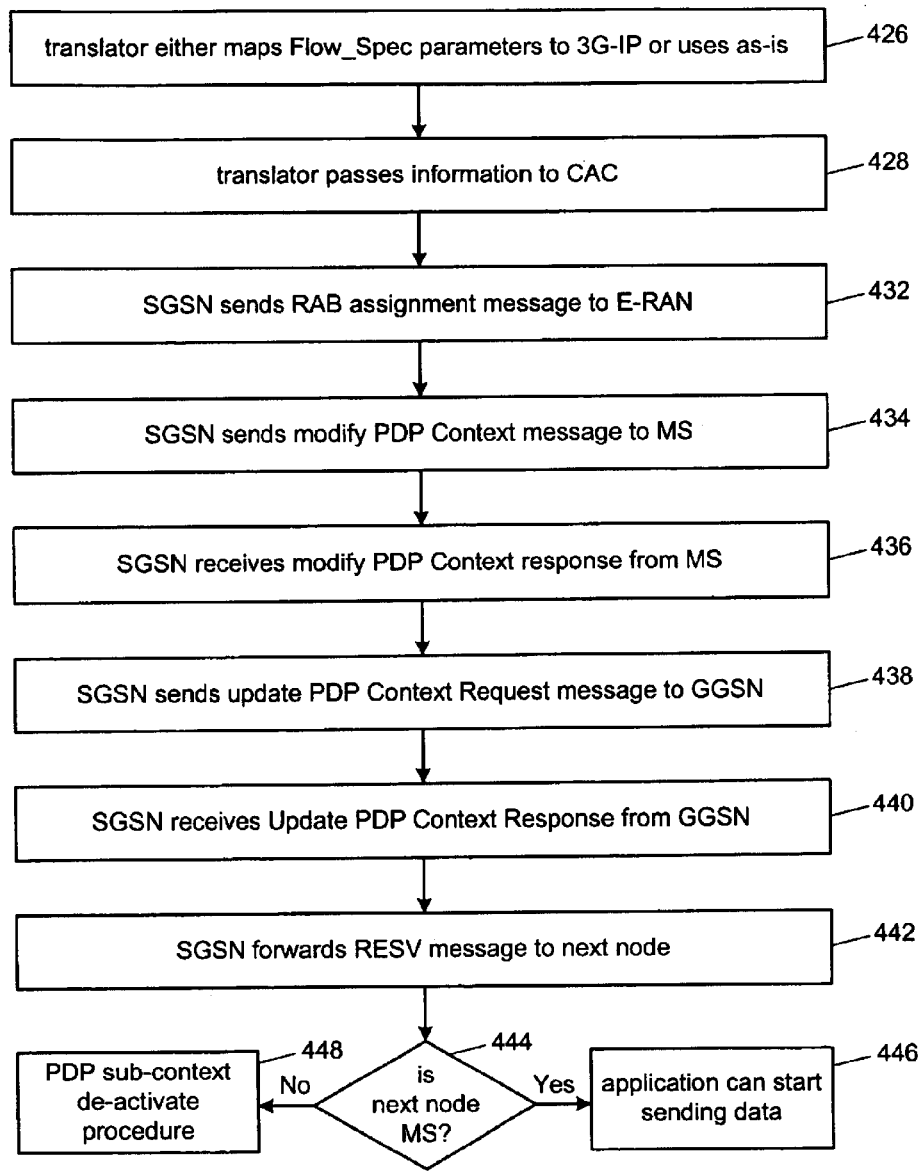

FIGS. 4A and 4B illustrate a flowchart of the process of the present invention. If the mobile station is the sender, the QoS-aware application, resident in the mobile station, provides the RSVP agent with the traffic characteristics (step 401) that are used to generate an RSVP PATH message containing the Sender_Tspec. The Sender_Tspec contains information about the traffic profile to be generated by the application. The traffic profile items are referred to in the art as the Peak_rate, token_rate, token_bucket_size, and Max_sdu_size. These profile items are well known in the art and are not discussed further.

The PATH message is transmitted to the receiver (step 402) and is intercepted by the RSVP-enabled routers in the path. Each of the routers installs the PATH state and forwards the PATH message towards the receiver (step 404). The PATH state installed in the SGSN includes the senders IP address and the RSVP session information.

If the receiver is a wireless unit, in addition to the process followed below, the receiver's BSC or GGSN or any other network node where the RSVP agent may reside, intercepts the PATH message and initiates setting up the resources required for the call to go through. If no resources are available, the packets are dropped.

If the receiver is either a wireline unit or a wireless receiver, the RSVP receiver intercepts the PATH message (step 406) and generates an RESV message containing the Flow_spec (comprising R_Spec and Receiver_Tspec). R_Spec contains information about the QoS requirements (rate and delay_slack_term) for the traffic described in the Receiver_Tspec. This is often the same as the Sender_Tspec contained in the PATH message.

The RESV message traverses the network (step 408) from the receiver through the routers in the opposite direction. At each RSVP-enabled router a call admission decision is made (step 410) based on the Flow_spec contained in the RESV message. If the flow is admitted (step 412), resources are reserved for that flow in the router and the RESV message is transmitted to the next downstream node (414). Otherwise, an RESV_ERROR message is generated and sent to the receiver (step 416).

The RSVP-agent in the wireless network node (e.g., GGSN) receives the RESV message (step 418). If the RSVP session in the RESV message matches that in the installed PATH state, it makes a call admission decision based on router resources (step 422). If successful, it passes the Flow_Spec information to a translator function and the sender's IP address and RSVP session information to the Admission Controller function (step 424). These two functions are part of the Policy Control Function that is illustrated in FIG. 5 and may be located at GGSN or any other network node in the wireless network.

Figure 5:
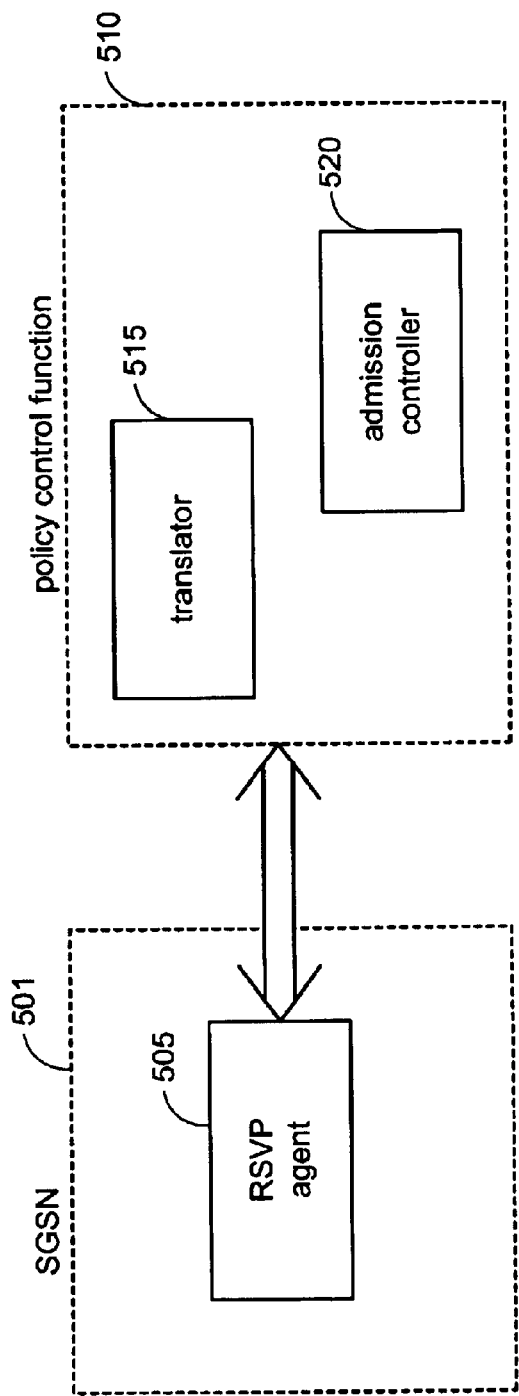
FIG. 5 shows a block diagram of the relationship between the SGSN and the Policy Control Function.

Referring to FIG. 5, it can be seen that the RSVP agent (505) in the GGSN (501) communicates with the Policy Control Function (510). The policy control function (510) includes the translator (515) and the admission controller (520).

Referring to FIG. 4B, the translator either maps the Flow_Spec parameters to the third generation IP bearer attributes (3G TR23.907) or uses the parameters as-is (step 426). This is done based on the configuration of the translator. It then passes this information to the Call Admission Controller (CAC) function (step 428).

The CAC identifies the user by the sender's IP address and gets its subscription information from the SGSN. A policy-based call admission decision is made based on the subscription information and the requested QoS (bearer attributes).

If a new Radio Access Bearer (RAB) is needed, the SGSN sends a RAB Assignment message to the Radio Access Network (RAN) resource manager (step 432) triggering the RAB assignment/modification procedure. During these past two steps of the process of the present invention, the QoS attributes that can be delivered to the user may be modified (downgraded) from those initially requested.

If successful, the SGSN initiates the PDP sub-context activation procedure in the subsequent four steps. These steps include the SGSN first sending a Modify PDP Context message to the mobile station (step 434). The SGSN then receives the Modify PDP Context response message from the mobile station (step 436).

After the receipt of the message, the SGSN sends an Update PDP Context Request message to the GGSN (step 438). The SGSN then receives an Update PDP Context Response from the GGSN (step 440).

If the above-described steps (434–440) are successful, the RSVP agent is allowed to forward the RESV message to the next node it its path (step 442). If the next node in the path is the mobile station (step 444), the receipt has been successfully established and the application can start sending data (step 446). The reservation may fail if the next node in the path is another router. In that case, the router generated RESV_ERROR message should trigger the PDP sub-context de-activation procedure on the part of the network (step 448).

The difference between the mobile station being the sender, as described above, and the mobile station being the receiver is the fact that the mobile station now generates the RESV message after it has received a PATH message from the sender. As in the previous case, the RESV message is captured by the RSVP-enabled wireless network node. The call admission control, RAB, and PDP sub-context establishment proceed as in the previous case. After successful completion of these events, the RESV message is allowed to proceed to its next destination.

Figure 6:
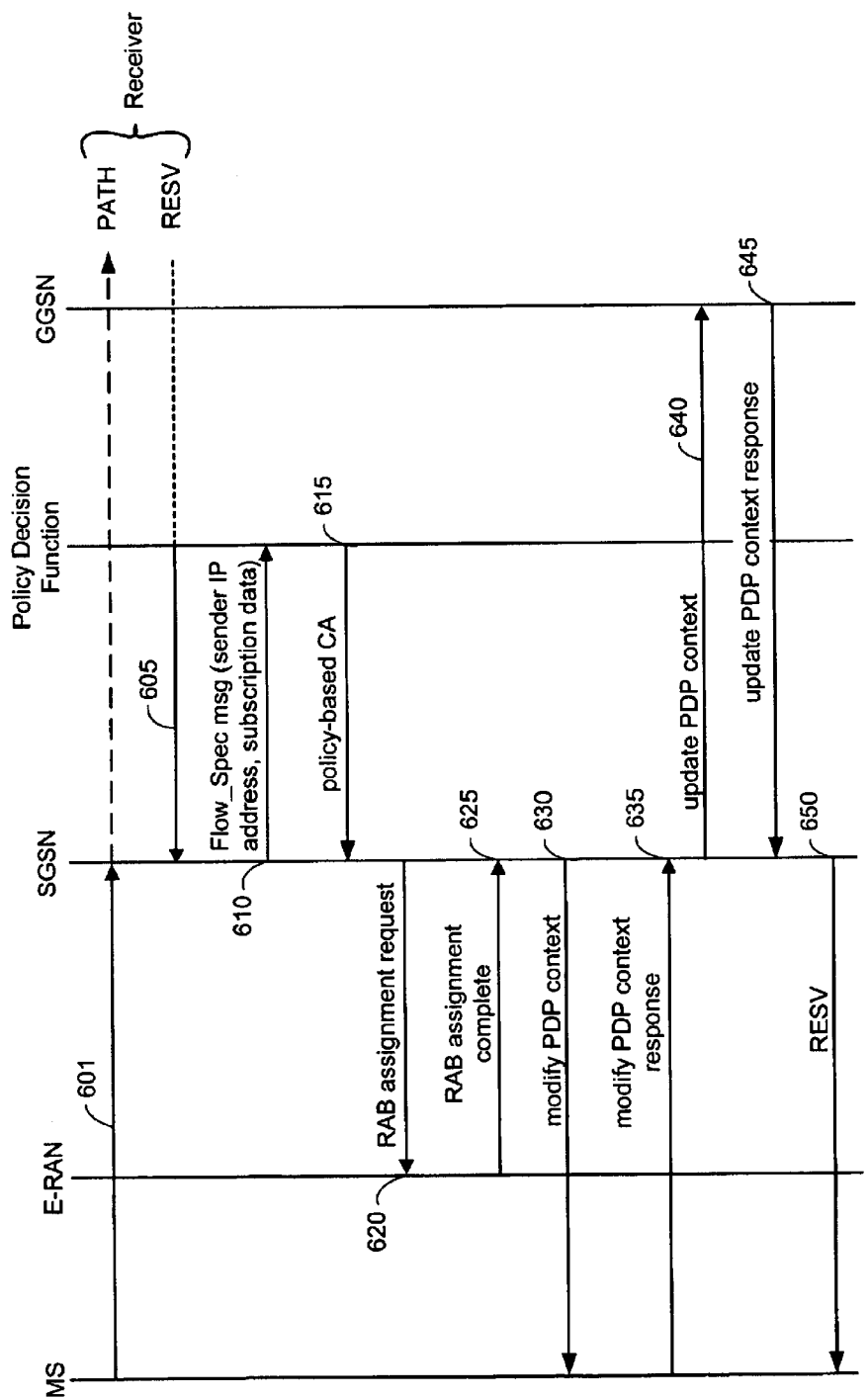
FIG. 6 shows a message flow diagram in accordance with the present invention.

FIG. 6 illustrates the message flow diagram of the present invention. This message flow diagram operates in conjunction with the flowchart of FIG. 4 discussed above. For purposes of clarity, the details of each message are not repeated again in FIG. 6 since they were already discussed with reference to FIG. 4.

The message flow starts with the mobile station sending a message to a wireless network node (e.g., GGSN) (601) with the PATH information. The Policy Decision Function sends the RESV message to the network node (605). The node sends the Flow_Spec message to the Policy Decision Function (610) containing the sender's IP address and subscription data.

The Policy Decision Function replies back to the SGSN with the policy-based call admission (615). The SGSN sends the RAB assignment request to the E-RAN (620).

The E-RAN replies back to the SGSN with the assignment complete message (625). The SGSN sends the modify PDP context message to the mobile station (630). The mobile station sends the response to the modify PDP context message back to the SGSN (635).

The SGSN updates the PDP context with the network node (e.g., GGSN) (640). The network node responds back to the SGSN (645). Finally, the network node sends the RESV message to the mobile station (650).

The table in FIG. 7 illustrates the preferred GQOS mapping between GQOS and RSVP Flow_Spec (Tspec and Rspec). The Universal Mobile Transmission System (UMTS) specification (3G TR23.907) lists a set of traffic attributes such as maximum bit rate, guaranteed bit rate, delivery order, maximum SDU size, SDU format, SDU loss ratio, residual bit error ratio, delivery of erroneous SDU's, transfer delay, and traffic handling priority. Note that there is a one-to-one mapping between some of the traffic attributes specified in UMTS and GQOS Flow_Spec parameters. For example, the maximum bit rate is mapped to the PeakBandwidth, the Guaranteed bit rate is mapped to the TokenRate, the Maximum SDU size is mapped to the MaxSduSize, and the Latency is mapped to the Transfer delay.

In summary, the process and system of the present invention provides end-to-end QoS to a wireless mobile station communicating with a network. The present invention interfaces the QoS standard used by the wireless air interface standard with the RSVP QoS process used by the network.

The RSVP signaling is used to perform PDP sub-context activation. RSVP is already a part of the WINDOWS 98 operating system. QoS Application Programming Interface (API) like MICROSOFT'S GQoS API are already part of the same operating systems (e.g., Windows 2000). Usage of already available IP QoS support in the E-GPRS network will be beneficial in many ways.

One benefit is to optimize the air-link messaging to establish PDP sub-context. Existing message sets, with small modifications, can be used. Also, development costs and cycle-times are reduced as already standardized and/or off-the-shelf software components can be used. Finally, new wireless API's need not be developed.

The above-described preferred embodiment does not prevent the usage of other proposed secondary PDP context (or PDP sub-context) activation procedures (e.g., 3GPP-1, 3GIP-1). However, preferably suitable checks are imposed in order not to duplicate the effort.

Numerous modifications and variations of the present invention are possible in light of the above teachings. It is therefore to be understood that within the scope of the appended claims, the invention may be practiced otherwise than as specifically described herein.

What is claimed is:

1. A method for generating end-to-end quality of service in a wireless network comprising a plurality of RSVP-enabled routers coupled to at least one base station controller that communicates traffic with a mobile station over a wireless link, the mobile station communicating to an end terminal through the network, the method comprising the steps of:

the mobile station transmitting traffic characteristics message to the plurality of routers through the wireless link using a wireless quality of service standard;

the end terminal receiving the traffic characteristics message;

the end terminal transmitting an RESV response message through the network to the mobile station;

a first base station controller of the at least one base station controllers intercepting the RESV response message;

the first base station controller checking wireless resources for capability to handle a call;

if the wireless resources cannot handle the call, the first base station controller dropping the RESV response message;

if the wireless resources can handle the call, the first base station controller setting up the wireless resources to handle the call; and if the wireless resources can handle the call, the first base station controller forwarding the RESV response message to the mobile station.

2. The method of claim 1 and further including the steps of:

coupling the end terminal to the network through a second base station controller of the at least one base station controller and a wireless link;

the second base station controller intercepting the traffic characteristics message before reaching the end terminal;

the second base station controller attempting to set up wireless link resources for transmitting the traffic characteristics message to the end terminal;

if the second base station controller cannot set up the wireless link resources, the second base station controller dropping the traffic characteristics message; and if the second base station controller can set up the wireless link resources, the second base station controller forwarding the traffic characteristics message to the end terminal through the wireless link.

3. The method of claim 2 wherein the traffic characteristics message is a PATH message.

4. The method of claim 1 wherein the network is comprised of an RSVP-aware Serving GPRS Support Node coupled to the first base station controller and a Gateway GPRS Support Node coupled between the Serving GPRS Support Node and the end terminal.

5. The method of claim 4 and further including the steps of:

the Serving GPRS Support Node intercepting the traffic characteristics message and the RESV response message;

the Serving GPRS Support Node modifying the traffic characteristics message and the RESV response message to reflect constraints of the wireless link; and the Serving GPRS Support Node forwarding the modified traffic message and the modified RESV response message.

6. A method for coupling a mobile station over an air interface, having a wireless quality of service standard, to an RSVP-aware network, the network being coupled to an end terminal, the mobile station having an application that is wireless quality of service standard compliant, the network comprising an RSVP agent and a plurality of routers that are RSVP-aware, the plurality of routers including a Serving GPRS Support Node, the method comprising the steps of:

the application providing an RSVP agent with the traffic characteristics that are used to generate an RSVP PATH message;

sending the PATH message towards the end terminal;

the plurality of routers intercepting the PATH message and installing a PATH state from the PATH message before forwarding the PATH message to the end terminal, the PATH state installed in the Serving GPRS Support Node including the mobile terminal's IP address and RSVP session information;

the RSVP agent intercepting the PATH message and generating an RESV message containing Flow_Spec information;

each router intercepting the RESV message and making a call admission decision based on the Flow_Spec information in the RESV message;

if data flow is admitted through a particular router, reserving the sources in that particular router for the data flow;

if data flow is admitted through the particular router, transmitting the RESV message to a next downstream node;

if the data flow is not admitted, generating an error message;

the RSVP agent in the Serving General Packet Radio Service (GPRS) Support Node receiving the RESV message;

if the RESV message matches the installed PATH state, making a call admission decision based on router resources available;

a translator function mapping the Flow_Spec information to an Internet Protocol bearer attribute;

the translator function forwarding the mapped Flow_Spec information to a call admission controller;

the call admission controller identifying the mobile station using the IP address;

the call admission controller retrieving subscription information regarding the mobile station from the Serving GPRS Support Node; and making a policy-based call admission decision based on the subscription information and requested quality of service.

7. The method of claim 6 wherein the air interface is a general packet radio service standard.

8. The method of claim 6 and further including the steps of:

if a new radio assignment bearer is required, the Serving GPRS Support Node sending a radio access bearer assignment message to an E-RAN resource manager;

the E-RAN resource manager triggering the RAB assignment;

if the RAB assignment is successful, the Serving GPRS Support Node sending a modified packet data protocol sub-context activation comprising the steps of:

the Serving GPRS Support Node sending a modified packet data protocol context message to the mobile station;

the Serving GPRS Support Node receiving the modified packet data protocol context response message from the mobile station;

the Serving GPRS Support Node sending an updated packet data protocol context request message to a Gateway GPRS Support Node; and the Serving GPRS Support Node receiving the updated packet data protocol context response message from the Gateway GPRS Support Node; and if the modified packet data protocol sub-context activation is successful, the RSVP agent forwarding the RESV message to the next node in the path.

9. The method of claim 8 and further including the steps of:

if the next node in the path is the mobile station, the mobile station sending data; and if the next node in the path is not the mobile station, generating an error message.

* * * * *